(12) United States Patent
Hsieh

(10) Patent No.: US 6,313,963 B1
(45) Date of Patent: Nov. 6, 2001

(54) VITERBI DETECTOR WITH PARTIAL ERASURE COMPENSATION FOR READ CHANNELS

(75) Inventor: Yenyu Hsieh, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/385,190

(22) Filed: Aug. 30, 1999

(51) Int. Cl.[7] ........................................ G11B 5/09
(52) U.S. Cl. ................................. 360/46; 360/53
(58) Field of Search .................. 360/46, 53, 45, 360/57, 66; 375/262, 341, 346; 714/794, 795, 796, 786, 787, 809

(56) References Cited

U.S. PATENT DOCUMENTS 5,862,161 * 1/1999 Reed et al. .......................... 714/809
5,926,490 * 7/1999 Reed et al. .......................... 714/787

OTHER PUBLICATIONS

Cideciyan, Roy D.; Dolivo, Francois; Hermann, Reto; Hirt, Walter, "A PRML System for Digital Magnetic Recording", Jan. 1, 1992, IEEE Journal on Selected Areas in Communications.

* cited by examiner

Primary Examiner—Alan T. Faber

(57) ABSTRACT

A system and method for partial erasure compensation for a read channel is disclosed. The method comprises receiving a signal at a first state, the first state having a branch extending to each of a plurality of possible next states, each branch corresponding to a target value, determining a partial erasure compensation for each of the target values corresponding to a branch between the first state and each of the possible next states based upon the first state and each of the possible next states, the partial erasure compensation being a function of an amplitude reduce by partial erasure, and modifying the target value with the determined partial erasure compensation.

20 Claims, 9 Drawing Sheets

| CHANNEL | TRANSFER FUNCTION | DIPULSE RESPONSE |
|---|---|---|
| PR4 | $(1-D)(1+D)$ | 0, 1, 0, -1, 0, 0, 0, ... |
| EPR4 | $(1-D)(1+D)^2$ | 0, 1, 1, -1, -1, 0, 0, ... |
| EEPR4 | $(1-D)(1+D)^3$ | 0, 1, 2, 0, -2, -1, 0, ... |

*FIG. 3*

| PREVIOUS STATE 602 | CURRENT STATE 602 | (n-5, n-4, n-3, n-2, n-1, n) | TARGET 608 $(X_{n-1}, X_n)$ | PARTIAL ERASURE COMPENSATION FOR $(X_{n-1}, X_n)$ |
|---|---|---|---|---|
| S0 | S0 | 000000 | 0, 0 | 0, 0 |
| S8 | S0 | 100000 | -1, 0 | -c/2, 0 |
| S4 | S0 | 010000 | -2, -1 | -2c, -c |
| S12 | S0 | 110000 | -3, -1 | 0, 0 |
| S0 | S1 | 000001 | 0, 1 | 0, c/2 |
| S8 | S1 | 100001 | -1, 1 | -c/2, c/2 |
| S4 | S1 | 010001 | -2, 0 | -2c, -c/2 |
| S12 | S1 | 110001 | -3, 0 | 0, c/2 |
| S0 | S2 | 000010 | 1, 2 | c, 2c |
| S8 | S2 | 100010 | 0, 2 | c/2, 2c |
| S4 | S2 | 010010 | -1, 1 | -c, c |
| S12 | S2 | 110010 | -2, 1 | c, 2c |
| S0 | S3 | 000011 | 1, 3 | 0, 0 |
| S8 | S3 | 100011 | 0, 3 | -c/2, 0 |
| S4 | S3 | 010011 | -1, 2 | -2c, -c |
| S12 | S3 | 110011 | -2, 2 | 0, 0 |
| S1 | S4 | 000100 | 2, 0 | 2c, 0 |
| S9 | S4 | 100100 | 1, 0 | 3c/2, 0 |
| S5 | S4 | 010100 | -, - | -, - |
| S13 | S4 | 110100 | -1, -1 | 2c, 2c |
| S1 | S6 | 000110 | 3, 2 | 0, -c/2 |
| S9 | S6 | 100110 | 2, 2 | -c/2, -c/2 |
| S5 | S6 | 010110 | -, - | -, - |
| S13 | S6 | 110110 | 0, 1 | 0, 3c/2 |
| S1 | S7 | 000111 | 3, 3 | 0, 0 |
| S9 | S7 | 100111 | 2, 3 | -c2, 3 |
| S5 | S7 | 010111 | -, - | -, - |
| S13 | S7 | 110111 | 0, 2 | 0, 2c |

*FIG. 7*

| PREVIOUS STATE 602 | CURRENT STATE 602 | (n-5, n-4, n-3, n-2, n-1, n) | TARGET 608 $(X_{n-1}, X_n)$ | PARTIAL ERASURE COMPENSATION FOR $(X_{n-1}, X_n)$ |
|---|---|---|---|---|
| S2 | S8 | 001000 | 0, -2 | 0, -2C |
| S10 | S8 | 101000 | -, - | -, - |
| S6 | S8 | 011000 | -2, -3 | -C/2, 0 |
| S14 | S8 | 111000 | -3, -3 | 0, 0 |
| S2 | S9 | 001001 | 0, -1 | 0, -3c/2 |
| S10 | S9 | 101001 | -, - | -, - |
| S6 | S9 | 011001 | -2, -2 | C/2, c/2 |
| S14 | S9 | 111001 | -3, -2 | 0, c/2 |
| S2 | S11 | 001011 | 1, 1 | -2c, -2c |
| S10 | S11 | 101011 | -, - | -, - |
| S6 | S11 | 011011 | -1, 0 | -3c/2, 0 |
| S14 | S11 | 111011 | -2, 0 | -2c, 0 |
| S3 | S12 | 001100 | 2, -2 | 0, 0 |
| S11 | S12 | 101100 | 1, -2 | 2c, c |
| 7 | S12 | 011100 | 0, -3 | c/2, 0 |
| S15 | S12 | 111100 | -1, -3 | 0, 0 |
| S3 | S13 | 001101 | 2, -1 | -c, -2c |
| S11 | S13 | 101101 | 1, -1 | c, -c |
| 7 | S13 | 011101 | 0, -2 | -c/2, -2c |
| S15 | S13 | 111101 | -1, -2 | -c, -2c |
| S3 | S14 | 001110 | 3, 0 | 0, -c/2 |
| S11 | S14 | 101110 | 2, 0 | 2c, c/2 |
| 7 | S14 | 011110 | 1, -1 | c/2, -c/2 |
| S15 | S14 | 111110 | 0, -1 | 0, -c/2 |
| S3 | S15 | 001111 | 3, 1 | 0, 0 |
| S11 | S15 | 101111 | 2, 1 | 2c, c |
| 7 | S15 | 011111 | 1, 0 | c/2, 0 |
| S15 | S15 | 111111 | 0, 0 | 0, 0 |

*FIG. 8*

| TARGET $\hat{X}$ | bm ($\alpha = 0$) | bm' | bm" (2*bm') |
|---|---|---|---|
| 0 | -27 | $-27-(\alpha^2/12)$ | $-54-(\alpha^2/6)$ |
| -1 | y-24 | $y-24-(\alpha^2/12)$ | $2y-48-(\alpha^2/6)$ |
| +1 | -y-24 | $-y-24-(\alpha^2/12)$ | $-2y-48-(\alpha^2/6)$ |
| -2 | 2y-15 | $2y-15-(\alpha^2/12)$ | $4y-30-(\alpha^2/6)$ |
| +2 | -2y-15 | $-2y-15-(\alpha^2/12)$ | $-4y-30-(\alpha^2/6)$ |
| -3 | 3y | $3y-(\alpha^2/12)$ | $6y-(\alpha^2/6)$ |
| +3 | -3y | $-3y-(\alpha^2/12)$ | $-6y-(\alpha^2/6)$ |

*FIG. 9*

PARTIAL ERASURE COMPENSATION

| PE (%) | 1. TO COMPENSATE SAMPLED VALUE. (BRANCH METRIC HAS FULL SQUARE TERM) | | | | 2. TO COMPENSATE BRANCH METRIC CALCULATION. | | | |
|---|---|---|---|---|---|---|---|---|
| | c/2 | c | 3c/2 | 2c | $(c/2)^2/12$ $\alpha^2/12$ | $c^2/12$ $\alpha^2/12$ | $(3c/2)^2/12$ $\alpha^2/12$ | $(2c/2)^2/12$ $\alpha^2/12$ |
| 5 | 0.15 | 0.30 | 0.45 | 0.60 | 0.002 | 0.008 | 0.017 | 0.030 |
| 10 | 0.30 | 0.60 | 0.90 | 1.20 | 0.008 | 0.030 | 0.068 | 0.120 |
| 15 | 0.45 | 0.90 | 1.35 | 1.80 | 0.017 | 0.068 | 0.152 | 0.270 |
| 20 | 0.60 | 1.20 | 1.80 | 2.40 | 0.030 | 0.120 | 0.270 | 0.480 |
| 25 | 0.75 | 1.50 | 2.25 | 3.00 | 0.047 | 0.188 | 0.422 | 0.750 |
| 30 | 0.90 | 1.80 | 2.70 | 3.60 | 0.068 | 0.270 | 0.608 | 1.080 |
| 35 | 1.05 | 2.10 | 3.15 | 4.20 | 0.092 | 0.368 | 0.827 | 1.470 |
| 40 | 1.20 | 2.40 | 3.60 | 4.80 | 0.120 | 0.480 | 1.080 | 1.920 |

| PE (%) | c/2 | c | 3c/2 | 2c | $(c/2)^2/12$ | $c^2/12$ | $(3c/2)^2/12$ | $(2c/2)^2/12$ |
|---|---|---|---|---|---|---|---|---|
| 5 | 0 | 0 | 0 | 1 | 0 | 0 | 0 | 0 |
| 10 | 0 | 1 | 1 | 1 | 0 | 0 | 0 | 0 |
| 15 | 0 | 1 | 1 | 2 | 0 | 0 | 0 | 0 |
| 30 | 1 | 2 | 3 | 4 | 0 | 0 | 1 | 1 |
| 35 | 1 | 2 | 3 | 4 | 0 | 0 | 1 | 1 |
| 40 | 1 | 2 | 4 | 5 | 0 | 0 | 1 | 2 |

FIG. 10

VITERBI DETECTOR WITH PARTIAL ERASURE COMPENSATION FOR READ CHANNELS

BACKGROUND OF THE INVENTION

1. Field of the Invention

The present invention relates generally to storage systems for digital computer and, more particularly, to a read channel employing a Viterbi detector with partial erasure compensation.

2. Description of Related Art

In a magnetic storage system for a digital computer, a digital data sequence is written as a sequence of magnetic flux transitions onto a surface of a magnetic medium in concentric, radially spaced tracks at a predetermined baud rate. The sequence of magnetic flux transitions corresponding to the digital data sequence are written onto the surface of the magnetic medium with a read/write head coil. The digital data sequence serves to modulate current in the read/write head coil.

In order to read the recorded data from the magnetic medium, the read/write head again passes over the surface of the magnetic medium and transduces the magnetic flux transitions into pulses of alternating magnetic polarity in a continuous time analog read signal. These pulses are decoded by read channel circuitry to reproduce the digital data sequence.

Decoding the pulses of alternating magnetic polarity into the digital data sequence can be performed by a peak detector in a conventional analog read channel. In such conventional analog read channel peak detectors, analog circuitry is responsive to threshold crossing or derivative information and detects peaks in the continuous time analog read signal generated by the read head. The continuous time analog read signal is segmented into bit cell periods and interpreted during these bit cell periods. The presence of a peak during the bit cell period is detected as a 1-bit, whereas the absence of a peak is detected as a 0-bit.

Within increasing data density, magnetic flux transitions are packed closer together on the magnetic medium. As a result, adjacent magnetic pulses begin to overlap with one another, causing distortions, generally known as intersymbol interference ("ISI"), in the read signal. ISI can cause a magnetic peak to shift out of its bit cell or to decrease in magnitude, leading to detection errors.

One common detection error occurs when the bit cells are not correctly aligned with the pulses in the continuous time analog read signal. Timing recovery adjusts the bit cell periods so that the magnetic peaks of the continuous time analog read signal occur on average in the center of the bit cells in order to minimize detection errors. As timing information is derived only when peaks are detected, the input digital data sequence is typically run length limited ("RLL"), which places a limit on the maximum on the number of consecutive 0-bits.

The effect of ISI can be reduced by decreasing the data density and/or by employing a coding scheme that places a lower limit on the number of 0-bits that occur between the 1-bits. Thus, a compromise must be reached between the conflicting goals of reducing ISI, which calls for a large number of consecutive 0-bits, and of timing recovery which calls for a small number of consecutive 0-bits. A (d,k) RLL code constrains the code to a minimum of d number of 0-bits between 1-bits and a maximum number of k number of consecutive 0-bits.

Discrete time sequence detectors in sampled amplitude read channels can compensate for limited amounts of ISI and are less susceptible to channel noise than analog peak detectors. As a result, discrete time sequence detectors increase the capacity and reliability of the magnetic storage system and are therefore generally preferred over simple analog peak detectors.

Examples of well known discrete time sequence detection methods include discrete time pulse detection ("DPD"), partial response ("PR") with Viterbi detection, maximum likelihood sequence detection ("MLSD"), decision-feedback equalization ("DFE"), enhanced decision-feedback equalization ("EDFE"), and fixed-delay tree-search with decision-feedback ("FDTS/DF").

Sampled amplitude detection, such as PR with Viterbi detection, allows for increased data density by compensating for ISI as well as the effect of channel noise. In addition, in contrast to conventional peak detection systems that detect the presence or absence of a peak, sampled amplitude detection detects digital data by interpreting or estimating, at discrete time instances, the actual value of the pulse data.

When employing sampled amplitude detection, the read channel generally comprises a sampling device for sampling the analog read signal, a timing recovery circuit for synchronizing the digital data samples to the baud rate, i.e., the code bit rate, a low-pass analog filter to process the read signal before it is sampled to reduce the effects of aliasing, a digital equalizing filter to equalize the digital data sample values according to a desired PR after the digital data signal has been sampled, and a discrete time sequence detector such as a Viterbi detector to interpret or estimate the equalized sample values in context to determine a most likely ("ML") sequence for the digital data sequence, i.e., using MLSD. As such, a sampled amplitude detection read channel can take into account the effects of ISI and channel noise during the detection process to thereby decrease the probability of detection errors and increase the effective signal to noise ratio. Thus, for a given (d,k) RLL code constraint, a sampled amplitude detection read channel allows for significantly higher data density than that provided by conventional analog peak detection read channels.

Several other forms of distortion in addition to ISI are often present in the analog read signal. An example of another form of distortion is partial erasure, caused by partial erasure of magnetically-stored information, particularly at high data densities. In magnetic storage, each bit of the digital information may, for example, be stored as an individual region in which most magnetic domains are oriented in the same direction. However, because a transition from one magnetic orientation to another is not abrupt but takes place over a finite distance, at high data transition densities, adjacent regions of magnetization having differing orientations interact to reduce the strength of magnetization of those individual regions.

For example, if the magnetization in a particular region has a predominantly north-south orientation and both of its neighboring regions have similar orientations, then the strength of its magnetization will be substantially unaltered by its neighbors and there is typically no partial erasure distortion. However, if the north-south oriented magnetization region has one neighbor with an opposite, i.e., south-north, orientation, the border with this neighbor will not be well defined and the net magnetization of the region will be reduced. This reduction in magnetization is exacerbated if both of the magnetization region's neighbors have opposite magnetic orientations. The reduction in the strength of magnetization of neighboring magnetization regions with oppositely oriented neighbors reduces the amplitude of corresponding pulses in the read signal and is referred to as partial erasure. Thus it is preferably for decoders to account for partial erasure.

One conventional solution to the partial erasure problem is to employ a sequence detector that can be matched to a read signal that includes partial erasure. However, conventional channel models for describing partial erasure may result in sequence detectors that are prohibitively complex. One method to simplify the partial erasure model is to model the reduction in amplitude of a pulse by a factor γ<1 if the partial erasure is caused by a single neighboring magnetic transition and by a factor $γ^2$ if the partial erasure is caused by two neighboring magnetic transitions. State machine models for a reduced complexity sequence detector matched to partial erasure in a PR4 d=0 read channel have been derived. However, such conventional solutions to the partial erasure problem are still complex and not optimal.

What is needed is a system and method for providing partial erasure compensation in a simple and efficient manner.

SUMMARY OF THE INVENTION

A Viterbi detector with partial erasure compensation for read channel is disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

In one embodiment, a method for partial erasure compensation for a read channel comprises receiving a signal at a first state, the first state having a branch extending to each of a plurality of possible next states, each branch corresponding to a target value, determining a partial erasure compensation for each of the target values corresponding to a branch between the first state and each of the possible next states based upon the first state and each of the possible next states, the partial erasure compensation being a function of an amplitude reduce by partial erasure, and modifying the target value with the determined partial erasure compensation.

In another embodiment, a Viterbi detector receives a signal and produces a detected signal using maximum likelihood sequence estimation. The Viterbi detector generally includes a receiver, a partial erasure processor, and a modification circuit. The receiver receives a signal at a first state, the first state having a branch extending to each of a plurality of possible next states, each branch corresponding to a target value. The partial erasure processor is adapted to determine a partial erasure compensation for each of the target values corresponding to a branch between the first state and each of the possible next states based upon the first state and each of the possible next states, where the partial erasure compensation is a function of an amplitude reduce by partial erasure. The modification circuit modifies the target value with the partial erasure compensation.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 3 is a table providing the dipulse responses of the three transfer functions of equalization filters;

FIGS. 7 and 8 are tables setting forth the partial erasure compensations for possible targets $(X_{n-1}, X_n)$, along with the corresponding previous states, the current states, values for (n−5, n−4, n−3, n −2, n −1, n), and the targets $(X_{n-1}, X_n)$;

FIG. 9 is a table setting forth the branch metric algorithms, bm, bm', and bm" for each target x̂, i.e., {−3,−2,−1, 0, 1, 2, 3}; and FIG. 10 is a table setting forth the values for the partial erasure compensation terms c/2, c, 3c/2, and 2c for some sample levels of partial erasure ranging from 5% to 40%.

DESCRIPTION OF SPECIFIC EMBODIMENTS

A Viterbi detector with partial erasure compensation for read channel is disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Format of Digital Data on Magnetic Medium

Figure 1:
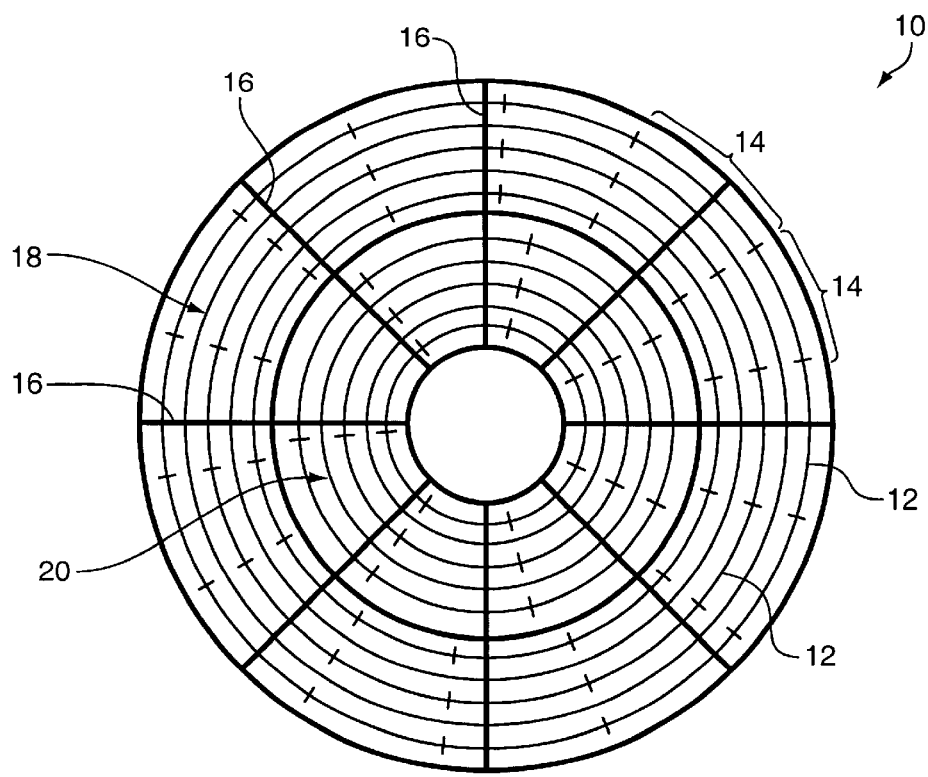
FIG. 1 shows an exemplary data format of a magnetic medium or disk.

FIG. 1 shows an exemplary data format of a magnetic medium or disk 10. The magnetic medium 10 defines concentric data tracks 12, each including a plurality of sectors 14, which in turn has servo fields 16 embedded in some of the sectors. A disk controller processes servo fields 16 to verify the positions of the tracks 12 and the sectors 14 relative to a read/write head. Additionally, the disk controller processes servo bursts within the servo fields 16 to keep the read/write head aligned over the desired track 12 while writing and reading data to the magnetic medium 10. In order to increase the overall storage density, the disk 10 shown is partitioned into an outer and an inner zone 18, 20, each comprising fourteen and seven data sectors per track, respectively. In practice, the disk 10 is typically partitioned into several zones and data is recorded and detected at varying data rates.

Figure 2:
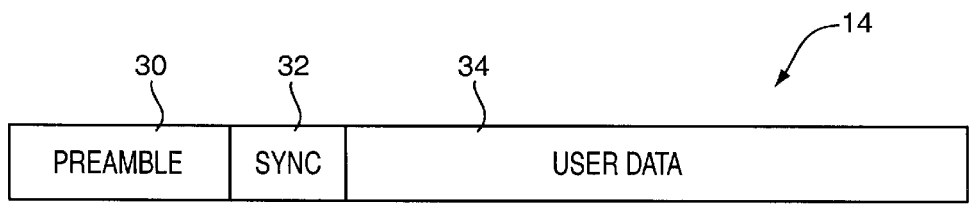
FIG. 2 shows a typical format of a data sector of the magnetic medium or disk.

FIG. 2 shows a typical format of the data sector 14. Each data sector 14 includes an acquisition preamble 30, a synchronization mark 32, and a user data 34. A timing recovery (not shown) processes the acquisition preamble 30 to acquire the correct sampling frequency and phase before reading user data 34 and synchronization mark 32 demarcates the beginning of user data 32.

Typical Sampled Amplitude Read/Write Channel

A simple form of a magnetic recording system for digital data generally results when the digital data is contained in a retrieved waveform, the data waveform is sampled at regular intervals, and the data is arranged such that each sample contains information from only one data bit. In such a simple magnetic recording system, a simple detector suffices to extract the data from the waveform. However, in typical a high-density recording system, each sample of the waveform usually contains information from adjacent overlapping samples.

Although sequence detectors can be built to extract the data from waveforms with multiple overlapping samples, such a sequence detector typically requires many states in its signal model. Equalization filters are thus typically included to adjust the pulse response of the magnetic system such that each pulse contains information from a very small number of bits, reducing the pulse width. Equalization filters, however, may also distort any noise that is present in the waveform.

Most sequence detectors perform optimally only when the noise samples are statistically independent and have a Gaussian probability distribution, which is not the case after the noise samples are distorted by the equalization filter. One common solution is to use an equalization filter that causes the overall magnetic recording channel to have a transfer function of a partial-response IV (PR4) type, an EPR4 type, or an EEPR4 type. In each of these equalization filter implementations, the post-filtering pulse shape exhibits nulls at all but a few chosen sampling points.

FIG. 3 is a table providing the dipulse responses of the three transfer functions of equalization filters. For example, the dipulse response of an EEPR4 system ideally produces a read sequence comprising a sample with unit amplitude (1), followed by a sample with an amplitude of two (2), followed by a sample with zero amplitude (0), followed by a sample with an amplitude of two and negative polarity (−2), and followed by a sample with unit amplitude and negative polarity (−1).

Figure 4:
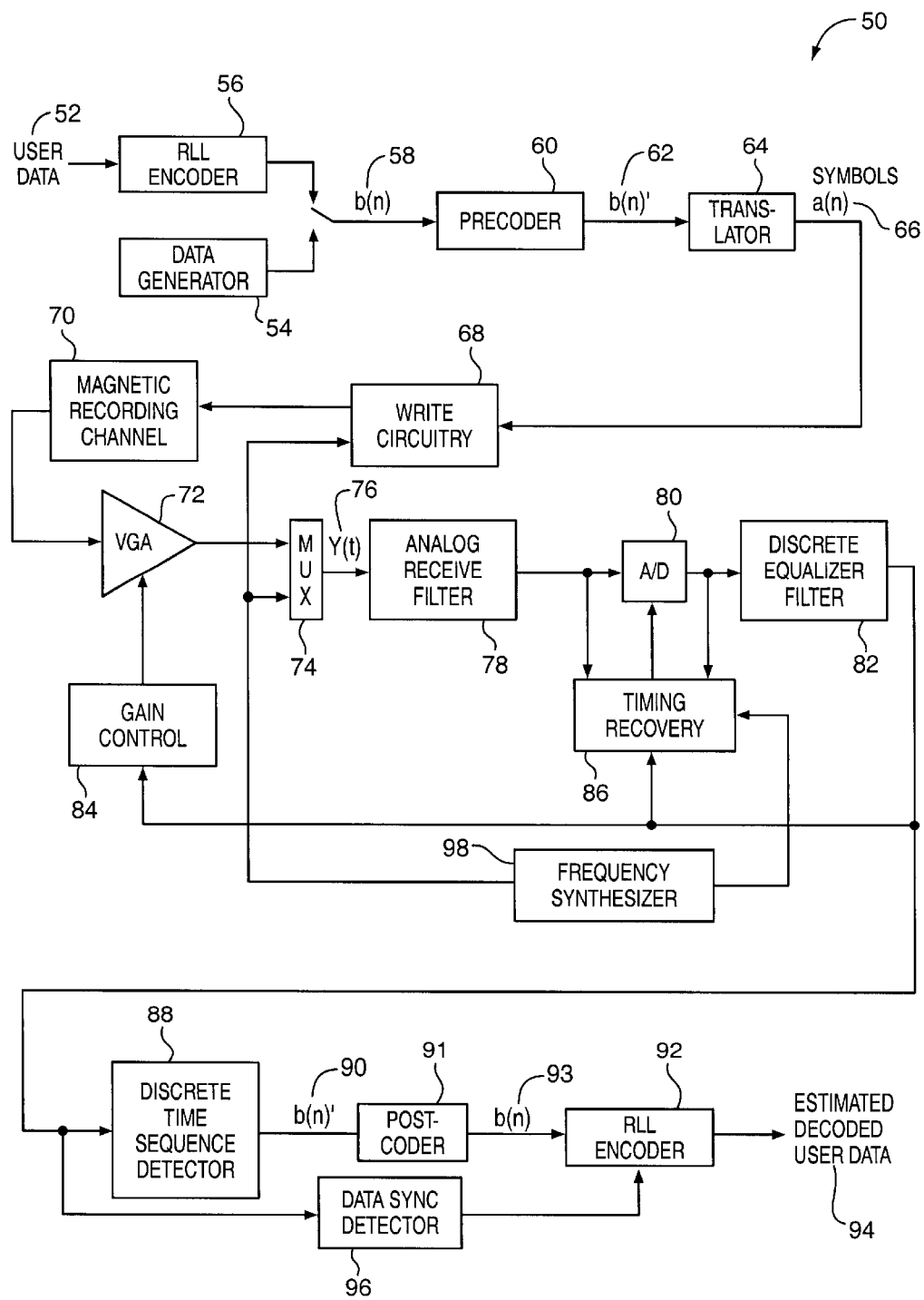
FIG. 4 is a block diagram of a typical sampled amplitude read/write recording channel using partial response signaling and sequence detection.

FIG. 4 is a block diagram of a typical sampled amplitude read/write recording channel 50 using partial response signaling and sequence detection. Components upstream and downstream of a magnetic recording channel 70 relate to a write and read operation, respectively, of the sampled amplitude read/write recording channel 50.

During a write operation, either user data 52 or preamble data, e.g., 2T preamble data, from a data generator 54 is written onto the magnetic medium. For the user data, an RLL encoder 56 encodes user data 52 into a binary sequence b(n) 58 according to a (d,k) RLL code constraint. A precoder 60 precodes the binary sequence 58 to compensate for the transfer function of the magnetic recording channel 70 and equalizing filters to form precoded sequence b(n)' 62. A translator 64 translates the precoded sequence b(n)' 62 into symbols a(n) 66 according to the certain rules. Write circuitry 68, responsive to the symbols a(n) 66, modulates the current in a recording head coil at a baud rate (1/T) to record the binary sequence onto the magnetic medium.

During a read back of the recorded binary sequence, a variable gain amplifier 22 adjusts the amplitude of the read back analog read signal and an analog receive filter 78 provides initial equalization of the analog read signal Y(t) 76 output from a multiplexer 74 toward a desired response. An analog-to-digital (A/D) converter or sampling device 80 samples the output of analog receive filter 78 and a discrete time equalizer filter 82 provides further equalization towards the desired response.

Equalized sample values from the discrete time equalizer filter 82 are applied to a gain control 84 and a timing recovery or control 86 for adjusting the amplitude of the read signal and the frequency and phase of the A/D sampling device 80, respectively. The timing recovery 86 adjusts the frequency of the A/D sampling device 80 in order to synchronize the equalized samples output from the discrete equalizer filter 82 to the waveform so that the effect of ISI is minimized. A frequency synthesizer 98 provides a course center frequency setting to the timing recovery circuit 86 in order to center the timing recovery frequency over temperature, voltage, and process variations. The frequency synthesizer 98 also provides a baud rate write block to the write circuitry 68.

The gain control 84 adjusts the gain of the variable gain amplifier 72. Equalized samples from the discrete equalizer filter 82 are sent to a discrete time sequence detector 88 to detect an estimated binary sequence b(n)' 90. The discrete time sequence detector 88 may, for example, be an ML Viterbi sequence detector. The estimated binary sequence b(n)' 90 is then input to a post decoder 91 which performs the opposite function of the precoder 60 and outputs b(n) 93 to an RLL decoder 92.

Equalized samples from the discrete equalizer filter 82 are also sent to a data synchronization detector 96 to detect the sync mark (reference number 32 as shown in FIG. 2) in the data sector in order to frame the operation of an RLL decoder 92. The RLL decoder 92 decodes the estimated binary sequence b(n)' 90 into an estimated decoded user data 94. In the absence of errors, the estimated binary sequence b(n)' 90 equals the recorded binary sequence b(n)' 62, the output b(n) 93 of the post coder 91 equals the binary sequence b(n) 58, and the estimated decoded user data 94 equals the recorded user data 52.

Distortion Due to Partial Erasure

As discussed above, partial erasure of information on the magnetic medium can result especially at high data densities and is particularly severe in regions of rapidly alternating magnetization. Partial erasure can occur, for example, when the write head attempts to magnetize a first portion of the magnetic medium in one orientation and then attempts to magnetize a second closely adjacent portion with an opposite orientation.

Figure 5A:
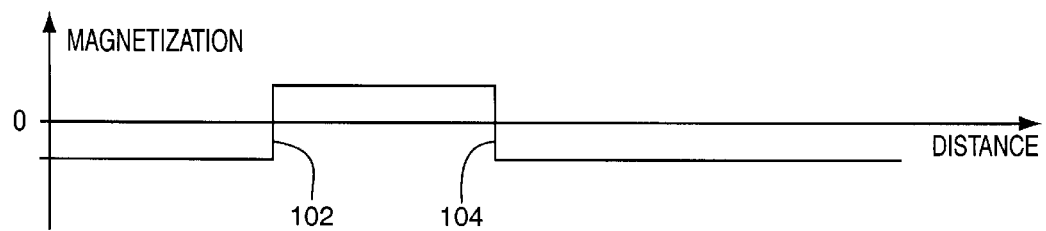
FIG. 5A shows an idealized plot of magnetization level against distance for two successive magnetization transitions in the magnetic medium.
Figure 5B:
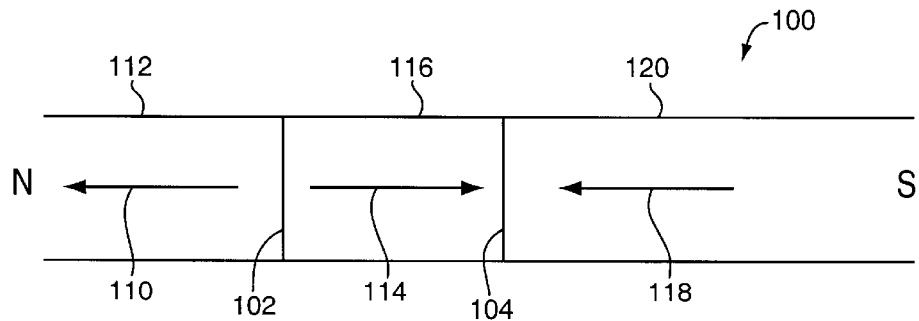
FIG. 5B is a schematic representation of a magnetic medium with magnetization corresponding to idealized magnetic orientation transitions.
Figure 5C:
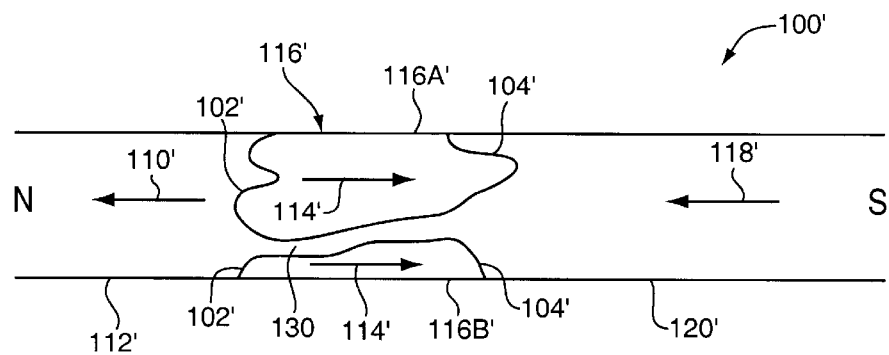
FIG. 5C is a schematic representation of effects of partial erasure in a magnetic medium with magnetization corresponding to non-idealized magnetic orientation transitions.

FIGS. 5A–5C illustrate partial erasure in a magnetic medium. FIG. 5A shows an idealized plot of magnetization level against distance for two successive magnetization transitions in the magnetic medium. A first transition occurs at a first boundary or position 102 and a second transition occurs at a second boundary or position 104.

FIG. 5B is a schematic representation of a magnetic medium 100 with magnetization corresponding to idealized magnetic orientation transitions. As shown, arrow 110 represents a south-north orientation of the magnetization in region 112 corresponding to the negative polarity prior to boundary 102 shown in FIG. 5A. Arrow 114 represents a north-south orientation of the magnetization in region 116 corresponding to the positive polarity between boundaries 102 and 104 shown in FIG. 5A. Arrow 118 represents a south-north orientation of the magnetization in region 120 corresponding to the negative polarity after boundary 104 shown in FIG. 5A. Ideally, each of regions 112, 116, 120 is magnetized to saturation in its specific orientation.

FIG. 5C is a schematic representation of effects of partial erasure in a magnetic medium 100' with magnetization corresponding to non-idealized magnetic orientation transitions, in contrast to the idealized magnetic orientation transitions shown in FIG. 5B. As shown in FIG. 5C, actual boundaries between regions of opposing magnetic orientations are not straight or well defined in practice.

Specifically, boundaries 102' and 104' are irregular and may even define isthmuses such as isthmus 130 linking regions of like magnetic orientation across a region of opposite magnetic orientation to thereby splitting that opposite magnetic orientation region into multiple sub-regions and reducing the effective width of the saturated magnetic medium. For example, as shown, the isthmus 130 separates the region 116' into sub-regions 116a' and 116b', and the combined width of these sub-regions is less than the width of the magnetic medium 100'. In addition, in practice, transitions from one magnetic orientation to another are gradual rather than abrupt. Further, since voltage pulses produced by read heads as they pass over the magnetic medium are determined by the rate of change of magnetic transitions, the key effect of the deviations of actual partially erased magnetic transitions from the ideal is to reduce the amplitude of these voltage pulses.

Figure 6:
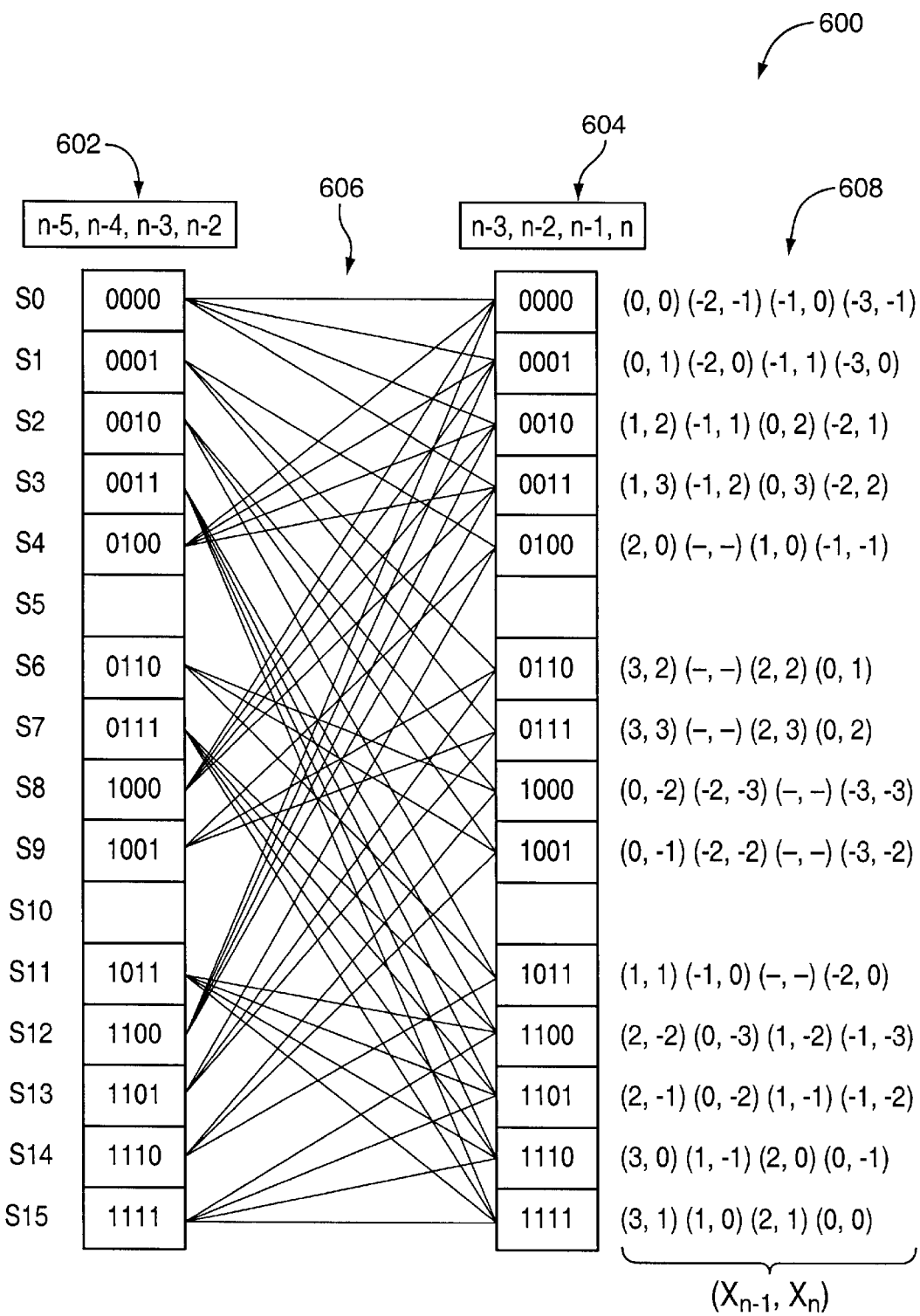
FIG. 6 is a Trellis diagram for Viterbi decoding where an EEPR4 or EEPRML transfer function is utilized.

FIG. 6 is a Trellis diagram 600 for Viterbi decoding where an EEPR4 or EEPRML transfer function is utilized. For each previous state 602, Viterbi decoding examines the possible branches 606, i.e. state sequences, from that previous state 602, and selects the best branch based on some conditional probabilities to arrive at the most likely current state 604. A Viterbi detector maximizes the correlation between the received vector or previous state 602 and the table of possible targets or target levels $(X_{n-1}, X_n)$ 608 based on the sampled values while sequentially performing the opposite operation of the coder.

In the embodiment shown in FIG. 6, there are a total of fourteen previous states 602 and the same fourteen current states 604. Two of the four-bit sixteen states, namely, S5 and S10, are not utilized because of the particular coding scheme implemented. However, any number of the sixteen possible states may be utilized. Further, although a 4-bit embodiment is shown, any other number of bits, e.g., 5-bit embodiment, may be implemented using the partial erasure compensation scheme described herein.

Each of the possible branches 606 between one of the previous states 602 and the current state 604 corresponds to one of the possible targets 608. Previous states 602 are taken at times n–5, n–4, n–3, and n–2 while the current states 604 are taken at times n–3, n–2, n–1, and n. Thus, the possible branches must be between a previous state 602 and a current state 604 where the last two bits of the previous state 602, i.e., at n–1 and n, are the same as the first two bits, i.e., at n–1 and n, of the current state 604. For example, the four possible branches from previous state 0000 must terminate at current states 0000, 0001, 0010, and 0011. Further, the four possible branches leading to current state 0000 originate from previous states 0000, 0100, 1000, and 1100.

As noted, each branch 606 corresponds to one of the targets 608. For example, the branch 606 between each of the previous states 0000, 0100, 0010, and 0011, and current state 0000 correspond to targets (0,0), (–2, –1), (–1, 0), and (–3, –1), respectively. With the effect of partial erasure, some of the values of the targets 608 are no longer accurate.

In order to improve the performance of the Viterbi detector under the condition of partial erasure, some of the values of the targets are optionally modified. The modification is called partial erasure compensation and is realized in the branch metric computation of certain branches that are affected by partial erasure.

As shown in FIG. 3, for Viterbi decoding where an EEPR4 or EEPRML transfer function is utilized, the transfer function or dipulse response has polynomial:

[1 2 0 –2 –1]

The specific target 608 is determined by convoluting the transfer function polynomial with the combined previous and current states, i.e., at times n–3, n–2, n–1, n, n+1, and n+2. Assuming that the amount of the amplitude reduced by partial erasure is c, the transfer function or dipulse response can be approximately modeled as:

[1–c 2–2c 0–2+2c –1+c]

Although the polynomial is expressed simply and symmetrically, the actual effects of partial erasure can be asymmetrical and much more complicated.

FIGS. 7 and 8 are tables setting forth the partial erasure compensations for possible targets $(X_{n-1}, X_n)$ 608, along with the corresponding previous states 602, the current states 604, the values for bits at n–3, n–2, n–1, n, n+1, n+2, and the targets $(X_{n-1}, X_n)$ 608. The 0 term is a no partial erasure compensation term. As noted above, the targets $(X_{n-1}, X_n)$ 608 can be determined by convoluting the transfer function polynomial with the combined previous and current states, i.e., at times n–5, n–4, n–3, n–2, n–1, and n. Bits at n–5, n–4, n–3, n–2, and n–1 determine the value of target $X_{n-1}$, while bits at n–4, n–3, n–2, n–1, and n determine the value of target $X_n$. Accordingly, to determine whether and how much of partial erasure compensation to apply for targets $X_{n-1}$ and $X_n$, the transitions neighboring bits at n–5, n–4, n–3, n–2, and n–1 and in bits at n–4, n–3, n–2, n–1, and n are examined, respectively.

For example, for previous state S0 and current state S2, the 6 bits are 000010. For the target $X_{n-1}$, the transitions neighboring bits at n–5, n–4, n–3, n–2, and n–1, i.e., bits 00001, and the targets $X_{n-1}$, $X_n$, have values 1 and 2, respectively, are examined. In this case, the 1-bit is neighbored by two transitions such that partial erasure compensation is applied for target $X_{n-1}$. For the target $X_n$, the transitions neighboring bits at n–4, n–3, n–2, n–1, and n, i.e., bits 00010, are examined. As noted, the 1-bit is neighbored by two transitions such that partial erasure compensation is applied for target $X_n$, i.e., a partial erasure causing condition. Thus, the partial erasure compensations for targets $X_{n-1}=1$, $X_n=2$ are (c) and (2c), respectively.

Note that certain of the terms include a one-half c, i.e., c/2, element. Such an element results from the last and current states having a single neighboring transition and the other neighboring element, whether having the same value or resulting in a transition, is unknown, i.e., an undetermined partial erasure condition. For example, for previous state S12 and current state S1, the 6 bits are 110001 and the targets $X_{n-1}$, $X_n$, have values –3 and 0, respectively. For the target $X_{n-1}$, the transitions neighboring bits at n–5, n–4, n–3, n–2, and n–1, i.e., bits 11000, are examined. In this case, none of the bits is neighbored by two transitions such that no partial erasure compensation is applied for target $X_{n-1}$. For the target $X_n$, the transitions neighboring bits at n–4, n–3, n–2, n–1, and n, i.e., bits 10001, are examined. The left-most 1-bit is neighbored by only one transition.

However, whether the right-most 1-bit is neighbored by one or two transitions is not known. If the right-most 1-bit were neighbored by one transition, then no partial erasure compensation would applied for target $X_n$. If, on the other hand, the right-most 1-bit were neighbored by two transitions, then partial erasure compensation in the amount of c would applied for target $X_n$. As such, an average of the partial erasure compensation for the two possibilities is utilized, i.e., c/2. As is evident from FIGS. 7 and 8, a set of all possible partial erasure compensation terms α includes:

$$\alpha = \{-2c, -3c/2, -c, -c/2, c/2, c, 3c/2, 2c\}$$

In a typical implementation of the circuit, branch metric algorithm is utilized:

$$\{y+\alpha-(6^*\hat{x})\}^2 = y^2 + 2\alpha y + \alpha^2 - 2(y+\alpha)^*6^*\hat{x} + (6^*\hat{x})^2 = \{-12y^*\hat{x} + (6^*\hat{x})^2\} + \{2\alpha y - 12^*\alpha^*\hat{x} + \alpha^2\} + y^2$$

where $\hat{x}$ is a target level, i.e., $\{-3, -2, -1, 0, 1, 2, 3\}$, y is the ADC sample value, and α is the partial erasure compensation value. The ADC sample value y corresponds to six times the target level $\hat{x}$. In one embodiment, range of the ADC sample value y ranges from −21 to +20 such that the range is greater than the possible range of noiseless values of ADC sample value y, i.e. from −18 to +18. Dropping the $y^2$ term from the above equation as $y^2$ is a term common to all branch metric algorithms and assuming:

$$y = (6^*\hat{x}) - \alpha,$$

the above equation becomes:

$$\{-12y^*\hat{x} + (6^*\hat{x})^2\} - \alpha^2.$$

Preferably, the equation is scaled down, e.g., by dividing by 12, so as to conserve the die size when implementing the methodology in the hardware, although at the cost of less resolution:

$$\{-y^*\hat{x} + 3^*\hat{x}^2\} + \{\alpha^2/12\}.$$

In other others, partial erasure compensation can be expressed as a function of the square of the partial erasure compensation terms α. Optionally, a percentage or fraction less than one, e.g., one-twelfth, of the partial erasure compensation terms α.

FIG. 9 is a table setting forth the branch metric algorithms, bm, bm', and bm" for each target $\hat{x}$, i.e., $\{-3, -2, -1, 0, 1, 2, 3\}$. Specifically, bm refers to branch metric algorithms where partial erasure compensation is not implemented, i.e., a α=0, bm' refers to branch metric algorithms implementing partial erasure compensation, and bm" is merely (bm'*2) for increased resolution.

FIG. 10 is a table setting forth the values for the partial erasure compensation terms c/2, c, 3c/2, and 2c for some sample levels of partial erasure, e.g., from 5% to 40% as well as those values with branch metric calculation. The amplitude reduced by the partial erasure c is approximately 0.30 for each 5% of partial erasure. For example, for 20% partial erasure, c is approximately 1.20, such that:

$$\{c/2, c, 3c/2, 2c\} = \{0.60, 1.20, 1.80, 2.40\}$$

The values rounded to the nearest integer of $\{c/2, c, 3c/2, 2c\}$ are shown as these may be utilized for the actual implemented partial erasure compensation values due to circuit design considerations. In general, partial erasures of between approximately 20% to 25% are typical.

In one embodiment, to compensate for partial erasure with branch metric calculation, the partial erasure compensations are $\alpha^2/12$, as discussed above. The values rounded to the nearest integer are also shown for branch metric calculation as they may be utilized for the actual implemented partial erasure compensation values due to circuit design considerations. As shown, in such a case, partial erasure compensation is implemented where the partial erasure is 25% or greater.

Although the preferred embodiment has been described in terms of Viterbi decoding where an EEPRML transfer function is utilized, it is to be understood that similar principles and concepts are applicable to Viterbi decoding utilizing other transfer functions. For example, a transfer function of [1 0 −1] for PR4 as shown in FIG. 3, can be modeled as [1−c 0 −1+c] to compensate for partial erasure. Similarly, a transfer function of [1 1 −1 −1] for EPR4 as shown in FIG. 3, can be modeled as [1−c −1c −1+c−1+c] to compensate for partial erasure. In other words, each element of a polynomial of the transfer function of the Viterbi detector is proportionately altered toward 0 by an amplitude reduced by the partial erasure, i.e., c.

The partial erasure compensation values are utilized to modify or adjust the target values. As is evident, each partial erasure compensation value is dependent upon the previous state and the possible target values or the possible branches from the previous state.

Although the embodiments have been described in terms of a magnetic recording channel, it is to be understood that any form of recording medium may employ the concepts and principles of the partial erasure compensation described above.

While the preferred embodiments of the present invention are described and illustrated herein, it will be appreciated that they are merely illustrative and that modifications can be made to these embodiments without departing from the spirit and scope of the invention. For example, the partial erasure compensation may be programmable although at a cost of increased die size and power and decreased speed. In addition, the partial erasure compensation scheme may be implemented in any Viterbi detector employing any other polynomial. Thus, the invention is intended to be defined only in terms of the following claims.

What is claimed is:

1. A method for compensating for partial erasure in a read channel read back of signals from a recording medium, comprising:

receiving a signal at a first state of a state machine, said first state having a branch extending to each of a plurality of possible next states of said state machine, wherein each branch corresponds to a target value, wherein said state machine has a total number of states and target values corresponding to the transfer function of the read channel independent of the compensation for partial erasure;

determining a partial erasure compensation for each of said target values corresponding to a branch between the first state and each of the possible next states based upon said first state and each of said possible next states, said partial erasure compensation is a function of an amplitude reduced by partial erasure; and modifying said target value with said determined partial erasure compensation, wherein the steps of determining and modifying are performed within branch metric computations of sequence detection in said read channel.

2. The method for compensating for partial erasure according to claim 1, wherein said branches extending from a first state to a plurality of possible next states correspond to a transfer function having polynomial [1 2 0 −2 −1], and wherein said determining is determining with a partial erasure compensated polynomial [1 −c 2−2c 0−2+2c −1+c], wherein c is said amplitude reduced by partial erasure.

3. The method for compensating for partial erasure according to claim 1, wherein said branches extending from a first state to a plurality of possible next states correspond to a transfer function having polynomial [1 1 −1 −1], and wherein said determining is determining with a partial erasure compensated polynomial [1−c 1−c −1+c −1+c], wherein c is said amplitude reduced by partial erasure.

4. The method for compensating for partial erasure according to claim 1, wherein said branches extending from a first state to a plurality of possible next states correspond to a transfer function having polynomial [1 0 −1], and wherein said determining is determining with a partial erasure compensated polynomial [1−c 0 −1+c], wherein c is said amplitude reduced said partial erasure.

5. The method for compensating for partial erasure according to claim 1, wherein said determining further includes altering said target value by one half of said partial erasure compensation when an undetermined partial erasure is present.

6. The method for compensating for partial erasure according to claim 1, wherein said determining further includes determining branch metrics partial erasure compensation values as a function of a square of said partial erasure compensation.

7. The method for compensating for partial erasure according to claim 6, wherein said determining branch metrics partial erasure compensation values is determined as a function of one-twelfth of said square of said partial erasure compensation.

8. The method for compensating for partial erasure according to claim 1, wherein said amplitude reduced by partial erasure is approximately 0.30 for each 5% of partial erasure.

9. The method for compensating for partial erasure according to claim 1, wherein said determining said partial erasure compensation for each of said target values includes rounding to a nearest integer.

10. A Viterbi detector for receiving a signal and producing a detected signal using maximum likelihood sequence estimation in a read channel, comprising:

means for receiving a signal at a first state of a state machine, said first state having a branch extending to each of a plurality of possible next states of said state machine, wherein each branch corresponds to a target value, wherein said state machine has a total number of states and target values corresponding to the transfer function of the read channel independent of the compensation for partial erasure;

means for determining a partial erasure compensation for each of said target values corresponding to a branch between the first state and each of the possible next states based upon said first state and each of said possible next states, said partial erasure compensation is a function of an amplitude reduced by partial erasure; and means for modifying said target value with said partial erasure compensation, wherein the means for determining and means for modifying are operable within branch metric computations of sequence estimation in said read channel.

11. A Viterbi detector for receiving a signal and producing a detected signal using maximum likelihood sequence estimation in a read channel, comprising:

a receiver for receiving a signal at a first state of a state machine, said first state having a branch extending to each of a plurality of possible next states of said state machine, wherein each branch corresponds to a target value, wherein said state machine has a total number of states and target values corresponding to the transfer function of the read channel independent of the compensation for partial erasure;

a partial erasure processor adapted to determine a partial erasure compensation for each of said target values corresponding to a branch between the first state and each of the possible next states based upon said first state and each of said possible next states, said partial erasure compensation is a function of an amplitude reduced by partial erasure a modification circuit for modifying said target value with said partial erasure compensation, wherein the partial erasure processor and modification circuit are operable within branch metric computations of sequence estimation in said read channel.

12. The Viterbi detector according to claim 11, wherein said partial erasure processor determines existence of condition causing partial erasure when a bit affecting the value of the target value is a partially erased bit having both neighboring bits differing from said partially erased bit.

13. The Viterbi detector according to claim 11, wherein a transfer function of said Viterbi detector having polynomial [1 2 0 −2 −1] is modeled with a partial erasure compensated polynomial [1−c 2−2c 0 −2+2c −1+c], wherein c is said amplitude reduced by partial erasure.

14. The Viterbi detector according to claim 11, wherein a transfer function of said Viterbi detector having polynomial [1 1 −1 −1], is modeled with a partial erasure compensated polynomial [1−c 1 −c −1+c −1+], wherein c is said amplitude reduced by partial erasure.

15. The Viterbi detector according to claim 11, wherein a transfer function of said Viterbi detector having polynomial [1 0 −1], is modeled with a partial erasure compensated polynomial [1−c 0 −1+c], wherein c is said amplitude reduced partial erasure.

16. The Viterbi detector according to claim 11, wherein said partial erasure processor is adapted to proportionately alter said target value toward 0 by one half of said amplitude reduced by the partial erasure when an undetermined partial erasure condition causing is present.

17. The Viterbi detector according to claim 11, wherein said partial erasure processor is adapted to determine branch metrics partial erasure compensation values as a function of a square of said amplitude reduced by the partial erasure when said condition causing partial erasure is present.

18. The Viterbi detector according to claim 17, said partial erasure processor is adapted to determine branch metrics partial erasure compensation values as a function of one-twelfth of said square of said amplitude reduced by the partial erasure when said condition causing partial erasure is present.

19. The Viterbi detector according to claim 11, wherein said amplitude reduced by the partial erasure is approximately 0.30 for each 5% of partial erasure.

20. The Viterbi detector according to claim 11, wherein said determining a partial erasure compensation for each of said target value includes rounding to a nearest integer.

* * * * *